United States Patent
Kurosaki (10) Patent No.: US 9,678,417 B2
(45) Date of Patent: Jun. 13, 2017

(54) LIGHT SOURCE UNIT INCLUDING LASER DIODES AS LIGHT SOURCES AND MICROLENS ARRAY AND PROJECTOR

(71) Applicant: CASIO COMPUTER CO., LTD., Tokyo (JP)

(72) Inventor: Hideyuki Kurosaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 168 days.

(21) Appl. No.: 14/621,558

(22) Filed: Feb. 13, 2015

(65) Prior Publication Data

US 2015/0234264 A1    Aug. 20, 2015

(30) Foreign Application Priority Data

Feb. 20, 2014    (JP) ................. 2014-030194

(51) Int. Cl.
| | |
|---|---|
| *G03B 21/20* | (2006.01) |
| *G03B 33/12* | (2006.01) |
| *H04N 9/31* | (2006.01) |
| *F21Y 115/30* | (2016.01) |
| *F21Y 115/10* | (2016.01) |
| *F21Y 113/13* | (2016.01) |

(52) U.S. Cl.
CPC ......... *G03B 21/204* (2013.01); *G03B 21/208* (2013.01); *G03B 33/12* (2013.01); *F21Y 2113/13* (2016.08); *F21Y 2115/10* (2016.08); *F21Y 2115/30* (2016.08); *G03B 21/2066* (2013.01); *H04N 9/3182* (2013.01)

(58) Field of Classification Search
CPC ......... G03B 21/14; G03B 21/20; F21K 99/00; F21S 2/00; F21V 13/04; H04N 9/31
See application file for complete search history.

(56) References Cited

U.S. PATENT DOCUMENTS

| | | | |
|---|---|---|---|
| 2006/0082887 A1* | 4/2006 | Po-Hung ............ | G02B 19/0014 359/626 |
| 2012/0249974 A1* | 10/2012 | Ogino ................ | G03B 21/2013 353/38 |

FOREIGN PATENT DOCUMENTS

JP    2013-190591 A    9/2013

* cited by examiner

*Primary Examiner* — Sultan Chowdhury
*Assistant Examiner* — Danell L Owens
(74) *Attorney, Agent, or Firm* — Scully, Scott, Murphy & Presser, P.C.

(57) ABSTRACT

A projector includes a light source unit comprising a microlens array having a first area and a second area having a wider interval than that of the first area, a first light source configured to emit light to be incident on the first area, and a second light source configured to emit light to be incident on the first area and the second area, wherein the microlens array diffuses the lights emitted from the first light source and the second light source by microlenses thereof, a collective lens collecting diffuse lights diffused by the microlens array, a display device on which the diffuse lights collected by the collective lens are shone to produce projected light, a projection optical system guiding the projected light produced by the display device, and a control unit controlling the display device and the light source unit.

20 Claims, 7 Drawing Sheets

LIGHT SOURCE UNIT INCLUDING LASER DIODES AS LIGHT SOURCES AND MICROLENS ARRAY AND PROJECTOR

CROSS-REFERENCE TO RELATED APPLICATION

This patent application is based upon and claims the benefit of priority under 35 USC 119 from the prior Japanese Patent Application No. 2014-30194 filed on Feb. 20, 2014, the entire disclosure of which, including the description, claims, drawings and abstract, is incorporated herein by reference.

BACKGROUND OF THE INVENTION

Field of the Invention

The present invention relates to a light source unit including laser diodes as light sources and a microlens array and a projector.

Description of the Related Art

In these days, data projectors are used on many occasions as an image projection system which projects an image of a screen of a personal computer or a video image, as well as images based on image data which is stored on a memory card on to a screen. Conventionally, the mainstream of these data projectors has been those which utilize a high-intensity discharge lamp as a light source. In recent years, however, there have been proposed projectors that use power-saving, long-life and high-intensity laser diodes.

A projector disclosed in Japanese Unexamined Patent Publication No. 2013-190591 (JP-2013-190591A) includes, as light sources, a blue laser oscillator that emits light in the blue wavelength range, a red laser oscillator that emits light in the red wavelength range, and a luminescent light emitting device that emits light in the green wavelength range as a result of excitation light being shone on to a luminescent material layer. Axes of light in the blue wavelength range and light in the red wavelength range intersect an axis of light in the green wavelength range at right angles, and a dichroic mirror is disposed in the position where the axes of the blue and red lights intersect the axis of the green light at right angles. This dichroic mirror transmits the light in the blue wavelength range and the light in the red wavelength range and reflects the light in the green wavelength range so as to emit the blue, red and green lights in the same direction. The lights emitted from the dichroic mirror are passed through a microlens array to obtain diffusive light whose intensity is distributed uniformly and are then guided to a display device.

In the projector disclosed in JP-2013-190591A, the lights emitted from the laser diodes and the luminescent light from the luminescent light emitting device are passed through the same microlens array. Generally speaking, light emitted from a laser diode has strong directionality and a narrow illumination range.

Because of these characteristics, in case laser light is incident on a microlens array that is adjusted to the incident range of light in the green wavelength range that is luminescent light, the laser light is shone on to a small number of microlenses, and hence, even though the laser light that has passed through the microlens array is superposed, there have been situations where the uniform intensity distribution is not achieved to a sufficient level.

Additionally, in case smaller microlenses are used to enhance the uniformity of laser light, the loss of transmitted light is increased by joint portions between the microlenses, resulting in a reduction in utilization efficiency of light.

The invention has been made in view of the problems inherent in the projector of the related art, and an object of the invention is to provide a projector in which the light efficiency of a light source is improved.

SUMMARY OF THE INVENTION

According to an aspect of the invention, there is provided a light source unit having a microlens array having a first area and a second area where microlenses are arranged with a wider pitch than a pitch with which microlenses are arranged in the first area, a first light source that emits light so as to be incident on the first area, and a second light source that emits light so as to be incident on the first area and the second area, wherein in the microlens array, the light emitted from the first light source and the light emitted from the second light source are diffused by the microlenses.

According to the other aspect of the invention, there is provided a projector having a light source unit having a microlens array having a first area and a second area where microlenses are arranged with a wider pitch than a pitch with which microlenses are arranged in the first area, a first light source that emits light so as to be incident on the first area, and a second light source that emits light so as to be incident on the first area and the second area, wherein in the microlens array, the light emitted from the first light source and the light emitted from the second light source are diffused by the microlenses, a collective lens that collects the diffuse lights that are diffused by the microlens array, a display device on to which the diffuse lights that are collected by the collective lens are shone to generate projected light, a projection optical system that guides the projected light generated in the display device, and a control unit that controls the display device and the light source unit.

DETAILED DESCRIPTION OF THE PREFERRED EMBODIMENT

Hereinafter, a best mode for carrying out the invention will be described by the use of the accompanying drawings. Although the following embodiment has various preferred technical limitations for carrying out the invention, those technical limitations are not intended to limit the scope of the invention to the embodiment and an illustrated example.

Figure 1:
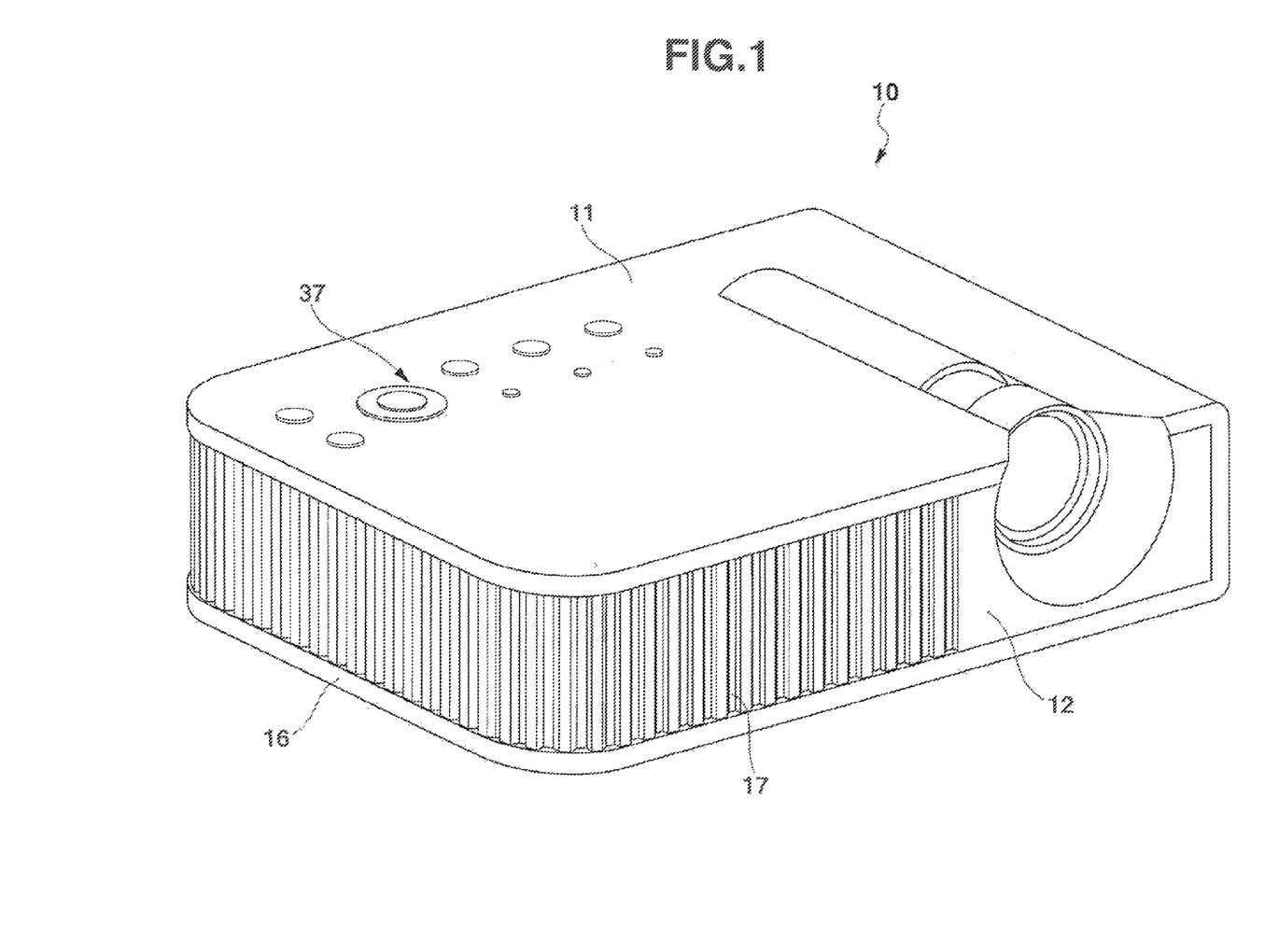
FIG. 1 is an external perspective view showing a projector according to an embodiment of the invention.

Hereinafter, an embodiment of the invention will be described in detail based on the drawings. FIG. 1 is an external perspective view of a projector 10. In this embodiment, when left and right are referred to in relation to the projector 10, they denote, respectively, left and right with respect to a projecting direction, and when front and rear are referred to in relation to the projector 10, they denote, respectively, front and rear with respect to a direction towards a screen from the projector 10 and a traveling direction of a pencil of light emitted from the projector 10.

The projector 10 has a substantially rectangular parallelepiped shape. The projector 10 has a projecting portion to a side of a front panel 12 that is a front side panel of a projector casing. A plurality of inside air outlet ports 17 are provided in the front panel 12. Further, although not shown, the projector 10 has an Ir reception unit that receives a control signal from a remote controller.

In addition, a keys/indicators unit 37 is provided on an upper case 11 of the casing. Disposed on this keys/indicators unit 37 are keys and indicators which include a power indicator, a projection switch key, an overheat indicator, and the like. The power indicator informs whether a power switch key or a power supply is on or off. The overheat indicator informs of an overheat condition occurring in a light source unit, a display device, a control unit or the like when they really overheat. Additionally, the upper case 11 covers an upper surface and part of a left side surface of the casing of the projector 10. The upper case 11 is configured so as to be removed from a lower case 16 to deal with a failure or the like when it really occurs.

Further, an input/output connector unit where USB terminals, an image signal D-SUB terminal where analog RGB image signals are inputted, an S terminal, an RCA terminal, a voice output terminal and the like are provided and various types of terminals including a power supply adaptor plug are provided on a back panel, not shown, at the rear of the casing. Additionally, a plurality of outside air inlet ports are formed in the back panel.

Figure 2:
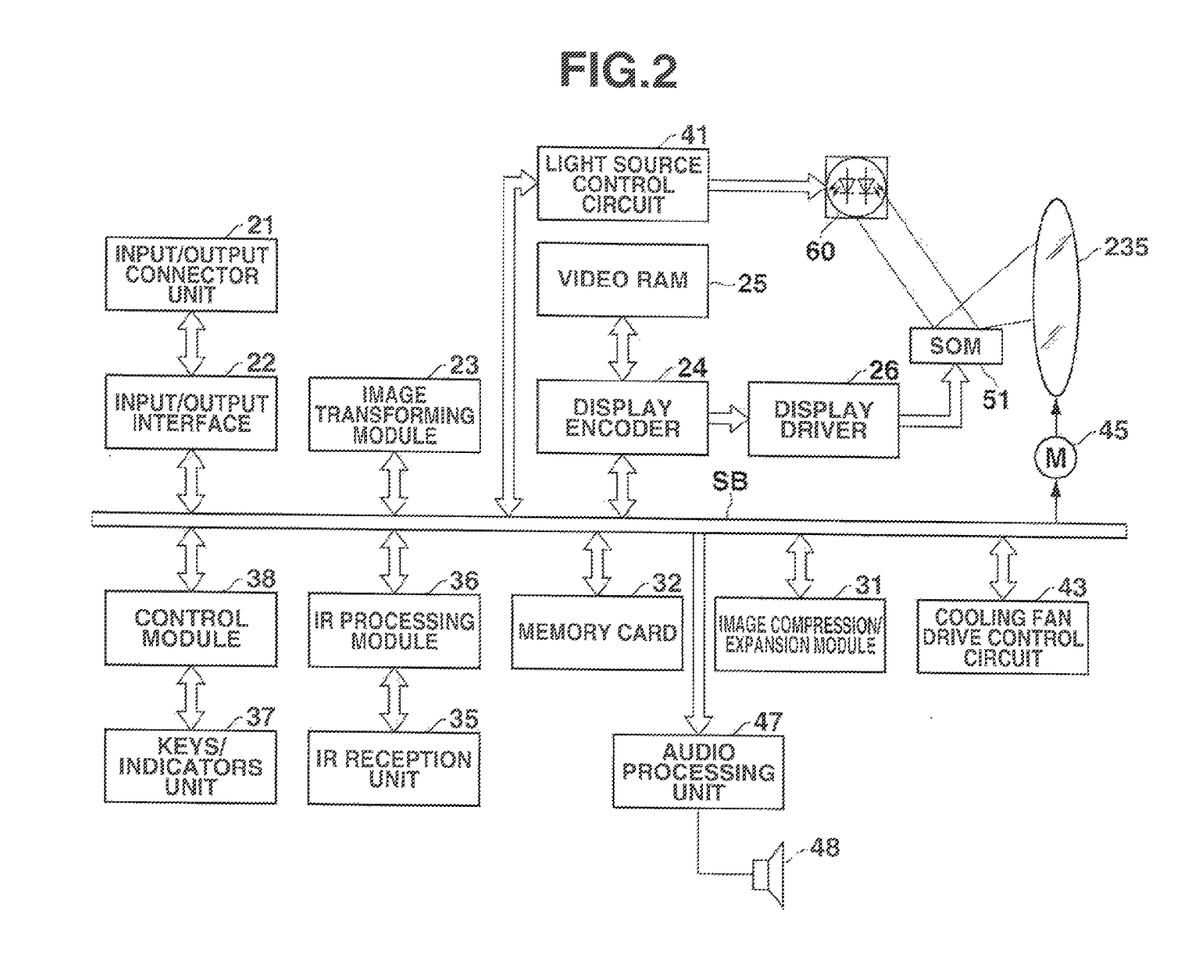
FIG. 2 is a functional block diagram of the projector according to the embodiment of the invention.

Next, a control unit of the projector 10 will be described by the use of a functional block diagram shown in FIG. 2. The control unit includes a control module 38, an input/output interface 22, an image transforming module 23, a display encoder 24, a display driver 26 and the like.

This control module 38 governs the control of operations of circuitries within the projector 10 and is made up of a CPU, a ROM which stores in a fixed fashion operation programs of various types of settings, a RAM which is used as a working memory, and the like.

Image signals of various standards that are inputted from an input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to the image signal outputted from the display encoder 24.

In this projector 10, a pencil of light that is emitted from a light source unit 60, which is a projector light source unit, is shone onto the display device 51 via an optical system, whereby an optical image is formed by using reflected light reflected by the display device 51. The image so formed is then projected on to a screen, not shown, for display thereon via a projection optical system. A movable lens group 235 of the projection optical system is driven by a lens motor 45 for zooming or focusing.

An image compression/expansion module 31 performs a recording process of data compressing a brightness signal and a color difference signal of the image signal to be sequentially written on a memory card 32 that is a detachable recording medium through operations using ADCT and the Huffman method.

Further, when in a reproducing mode, the image compression/expansion module 31 reads out the image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 that includes the main keys and the indicators that are provided on the upper case 11 of the casing are sent out directly to the control module 38. Key operation signals from the remote controller are received by the Ir reception unit 35, and cord signals are demodulated by an Ir processing module 36 to be outputted to the control module 38.

An audio processing unit 47 is connected to the control module 38 via the system bus (SB). This audio processing module 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control module 38 controls a light source control circuit 41 that is configured as a light source control unit. This light source control circuit 41 controls separately and individually the emission of light from a red light source device, a green light source device, and a blue light source device in the light source unit 60 so that lights in the predetermined wavelength ranges that are required when an image is generated are emitted from the light source unit 60.

Further, the control module 38 causes a cooling fan drive control circuit 43 to detect temperatures through a plurality of temperature sensors that are provided in the light source unit 60 and the like so as to control the rotating speeds of cooling fans based on the results of the temperature detections. The control module 38 also controls the cooling fan drive control circuit 43 so that the cooling fans continue to rotate even after the power supply to the projector 10 itself is turned off through a timer or the power supply to the projector 10 itself is turned off depending upon the results of the temperature detections by the temperature sensors.

Figure 3:
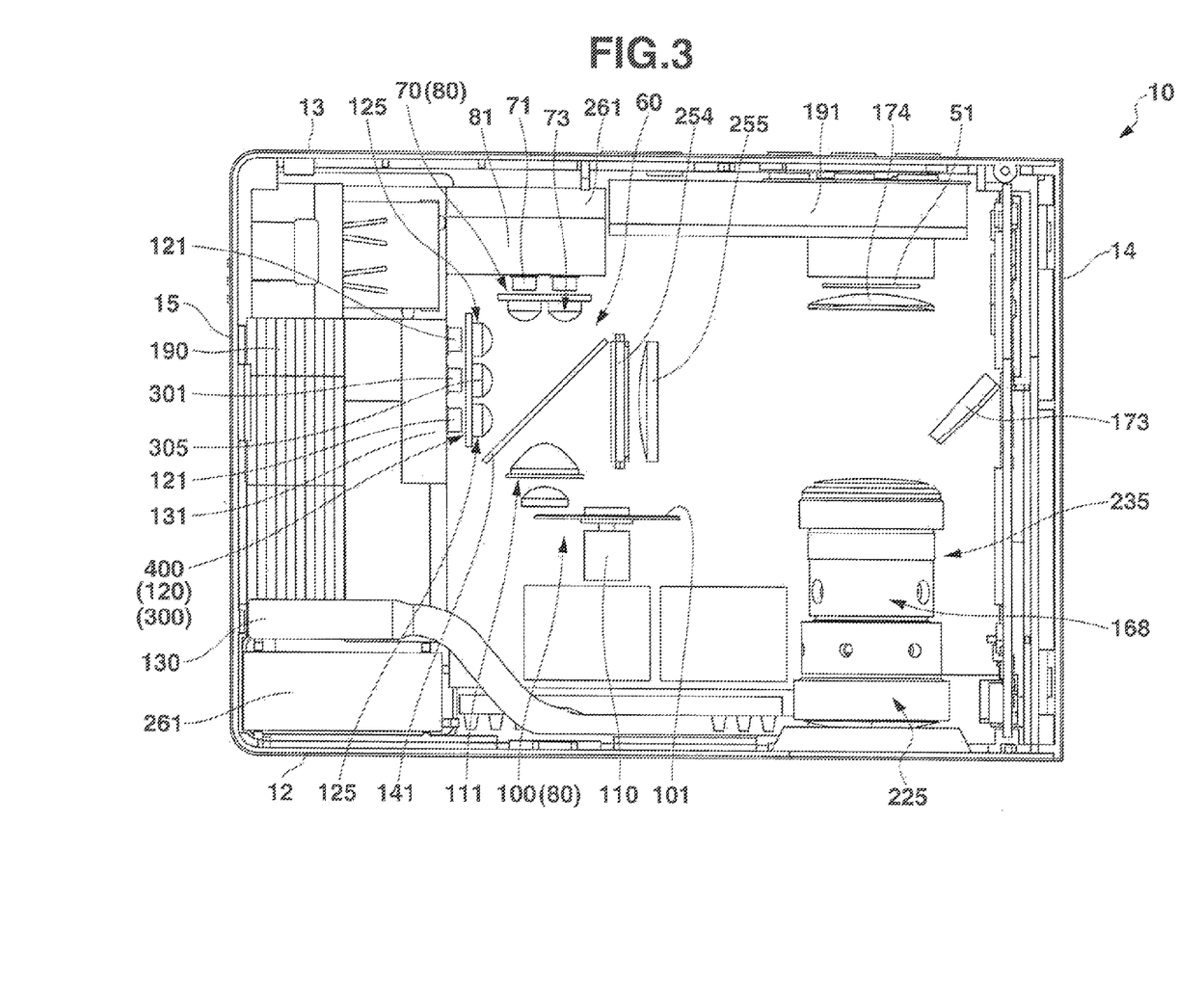
FIG. 3 is a schematic plan view showing an internal construction of the projector according to the embodiment of the invention.

Next, an internal construction of the projector 10 will be described. FIG. 3 is a schematic plan view showing the internal construction of the projector 10. The projector 10 has the light source unit 60 which is located substantially at a center of the projector 10 and a lens barrel 225. The lens barrel 225 incorporates a projection optical system and is disposed to the left side of the light source unit 60. Additionally, the projector 10 includes the display device 51 that is made up of DMDs, and the display device 51 is disposed between the lens barrel 225 and a back panel 13. Further, the projector 10 includes a main control circuit board below the light source unit 60.

The projector 10 includes a heat sink 191 between the display device 51 and the back panel 13, and this heat sink 191 cools the display device 51. Additionally, heat sinks 131, 190 are provided between the light source unit 60 and a right side panel 15, and these heat sinks 131, 190 cool red laser diodes 121 that make up a red light source device 120 and blue laser diodes 301 that make up a blue light source device 300.

The light source unit 60 includes a first light source, a second light source, a dichroic mirror 141, a microlens array 254, which will be described later, and a collective lens 255. The microlens array 254 has a similar shape to that of the display device 51. The first light source includes a semiconductor light emitting device. This semiconductor light emitting device is a two-color light source device 400. This two-color light source device 400 is disposed in a position that is situated substantially at a center in a front-to-rear direction and slightly rightwards of a center in a left-to-right direction of the casing of the projector 10. The two-color light source device 400 is made up of the blue light source device 300 and the red light source device 120. The second light source is a green light source device 80 that is made up of an excitation light shining device 70 and a luminescent light emitting device 100. The excitation light shining device 70 is disposed substantially at the center in the left-to-right direction of the casing of the projector 10. The luminescent light emitting device 100 is disposed on an axis of a pencil of light that is emitted from the excitation light shining device 70 and near the front panel 12.

The excitation light shining device 70, which makes up the green light source device 80 that is the second light source, includes excitation light sources 71 made up of semiconductor light emitting devices that are disposed so that their optical axes are normal to the back panel 13 and a heat sink 81 that is disposed between the excitation light sources 71 and the back panel 13.

The excitation light sources 71 are two blue laser diodes of semiconductor light emitting devices that are aligned side by side with each other in the left-to-right direction. Collimator lenses 73 are disposed individually on respective optical axes of the blue laser diodes. The collimator lenses 73 are collective lenses that convert lights from the blue laser diodes into parallel lights.

A cooling fan 261 is disposed between the heat sink 81 and the back panel 13. This cooling fan 261 is a blower fan that sends outside air towards the heat sink 81 as a cooling medium. The excitation light sources 71 are cooled by the cooling fan 261 and the heat sink 81.

The luminescent light emitting device 100, which makes up the green light source device 80 that is the second light source, includes a luminescent wheel 101, a wheel motor 110, and a collective lens group 111. The luminescent wheel 101 is disposed so as to be parallel to the front panel 12, that is, so as to intersect axes of lights emitted from the excitation light shining device 70 at right angles. The wheel motor 110 drives to rotate the luminescent wheel 101. The collective lens group 111 collects pencils of light that are emitted from the luminescent wheel 101 in the direction of the back panel 13. A heat sink 130 and the like are disposed between the wheel motor 110 and the front panel 12 to cool the luminescent wheel 101.

The luminescent wheel 101 is a circular disc-shaped metallic base material. An annular luminescent light emitting area is formed on the luminescent wheel 101 so as to be recessed which emits luminescent light in the green wavelength range by making use light emitted from the excitation light sources 71 as excitation light, and a luminescent material layer is provided in the annular luminescent light emitting area so that the luminescent material layer emits luminescent light by receiving the excitation light. A surface of the luminescent wheel 101 that includes the luminescent light emitting area and faces the excitation light sources 71 is mirror finished through silver deposition or the like to thereby form a reflecting surface that reflects light. A layer of a green luminescent material is laid out on this reflecting surface.

Light emitted from the excitation light shining device 70 is shone on to the green luminescent material layer of the luminescent wheel 101 to excite the green luminescent material. Then, pencils of luminescent light that are emitted in every direction from the green luminescent material are emitted directly towards the excitation light sources 71 or are reflected on the reflecting surface of the luminescent wheel 101 to thereafter be emitted towards the excitation light sources 71.

Excitation light that is shone on to the metallic base material without being absorbed by the luminescent material in the luminescent material layer is reflected by the reflecting surface to thereafter be incident on the luminescent material layer again for excitation of the luminescent material. Thus, the utilization efficiency of the excitation light in the blue wavelength range emitted from the excitation light sources 71 can be enhanced by forming the surface of the recess area of the luminescent wheel 101 into the reflecting surface, thereby making it possible to emit brighter green luminescent light.

In the two-color light source device 400 that is the first light source made up of the blue light source device 300 and the red light source device 120, the blue laser diodes 301 and the red laser diodes 121 are provided in parallel to each other in such a way that axes of lights emitted therefrom intersect axes of lights emitted from the excitation light sources 71 at right angles, that is, axes of lights emitted from the blue and red light sources intersect axes of luminescent lights emitted from the luminescent light emitting device 100 that makes up the green light source device 80 at right angles. The blue light source device 300 includes the blue laser diodes 301 and collimator lenses 305 that collect lights emitted from the blue laser diodes 301 into lights each having a predetermined illumination range for emission from the collimator lenses 305. Thus, the blue diodes 301 provided are two, which are aligned side by side with each other in a vertical direction.

The red laser diodes 121 of the red light source device 120 are arranged in such a way that two red laser diodes 121 are aligned vertically on each side of the two blue laser diodes 301 in relation to the front-to-rear direction of the casing of the projector 10. Thus, the red laser diodes 121 provided are four in total. The red light source device 120 includes the red laser diodes 121 and collimator lenses 125 that collect lights emitted from the red laser diodes 121 into lights each having a predetermined illumination range for emission from the collimator lenses 125. Then, the blue light source device 300 and the red light source device 120 are disposed so that optical axes thereof intersect with light emitted from the excitation light shining device 70 and light in the green wavelength range that is emitted from the luminescent wheel 101.

Laser beams that are emitted from the blue laser diodes 301 and the red laser diodes 121 are coherent light whose sectional shape normal to its axis is elliptic. The red laser diodes 121 and the blue laser diodes 301 are disposed by adjusting distances over which they are spaced apart from the corresponding collimator lenses 125, 205 so that lights emitted therefrom are shone on to predetermined ranges on the microlens array 254. Lights in the red wavelength range and lights in the blue wavelength range whose wavelength ranges are different are emitted closely parallel in the same direction.

A cooling fan 261 is disposed between the heat sinks 131, 190 and the front panel 12. This cooling fan 261 functions as a suction fan and sucks a cooling medium that is sent in by the blower and is then warmed up by the heat sinks 130, 190 to discharge it to the outside of the projector 10. This cooling fan 261 cools the red laser diodes 121 and the blue laser diodes 301.

The dichroic mirror 141 is disposed in a position where the axes of the light in the red wavelength range and the light in the blue wavelength range that are emitted from the two-color light source device 400 that is the first light source intersect with the axis of the light in the blue wavelength range that is emitted from the excitation light shining device 70 and the axis of the light in the green wavelength range that is emitted from the green light source device 80 that is the second light source at right angles. This dichroic mirror 141 transmits the lights in the blue and red wavelength ranges and reflects the light in the green wavelength range so that the direction of the axis of the green light is changed by 90 degrees in the direction of a left side panel 14. Consequently, the light in the red wavelength range, the light in the green wavelength range and the light in the blue wavelength range can be superposed on the same optical path.

The microlens array 254 is disposed to the left of the dichroic mirror 141. The microlens array 254 is intended to diffuse the lights emitted from the two-color light source device 400 that is the first light source and the light emitted from the green light source device 80 that is the second light source.

In this embodiment, the microlens array 254 is made up of biconvex microlenses each having a horizontally elongated rectangular shape when seen from thereabove that are arranged into a grid-like configuration. The plano-convex collective lens 255 is disposed on a side of the microlens array 254 that faces the left side panel 14. The collective lens 255 collects the diffuse lights that have passed through the microlens array 254 to an effective side of the display device 51 and superposes the diffuse lights one on another. This makes the luminance distribution in the effective size of the display device 51 uniform.

The light source lights that are emitted from the first light source and the second light source are diffused by the individual microlenses of the microlens array 254 and are then emitted to a light axis changing mirror 173 via the collective lens 255. On the other hand, a condenser lens 174 is provided in front of the display device 51. Thus, the light source lights that are reflected by the light axis changing mirror 173 are shone on to the display device 51 via the condenser lens 174.

"On" light that is reflected by the display device 51 is emitted on to a screen by a projection optical system 168 as projected light. This projection optical system 168 is made up of a variable-focus lens having a zooming function by including a fixed lens group that is incorporated in a lens barrel 225 and a movable lens group 235 that is incorporated in a movable lens barrel. The movable lens group 235 is moved by the lens motor for zooming and focusing.

Figure 4:
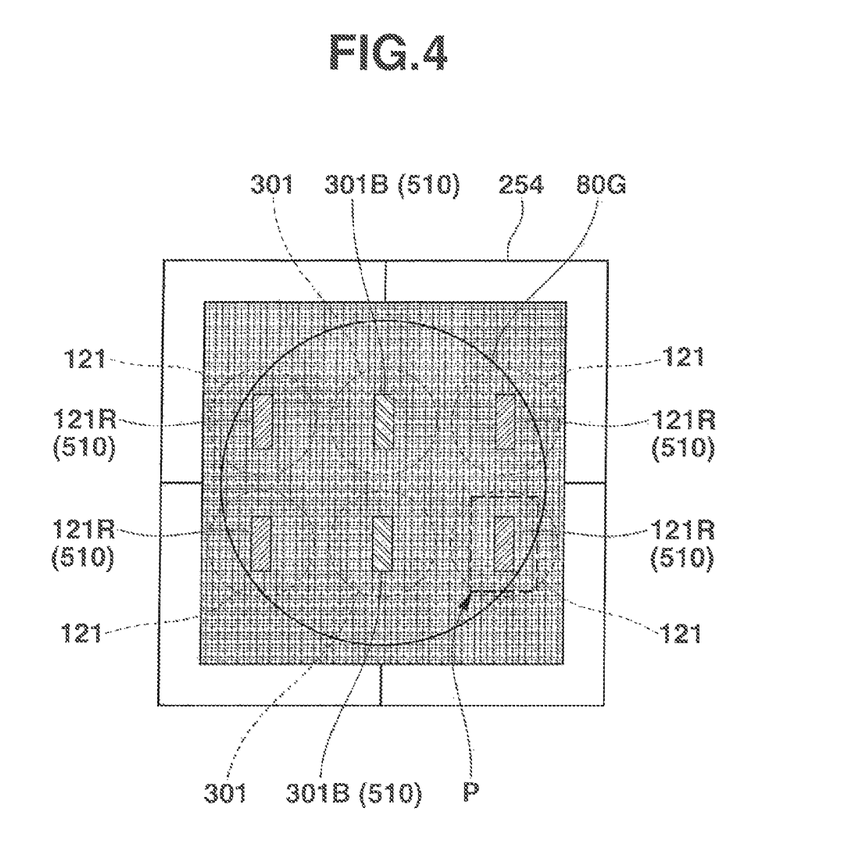
FIG. 4 is a schematic plan view showing how light is incident on a microlens array of the projector according to the embodiment of the invention.
Figure 5:
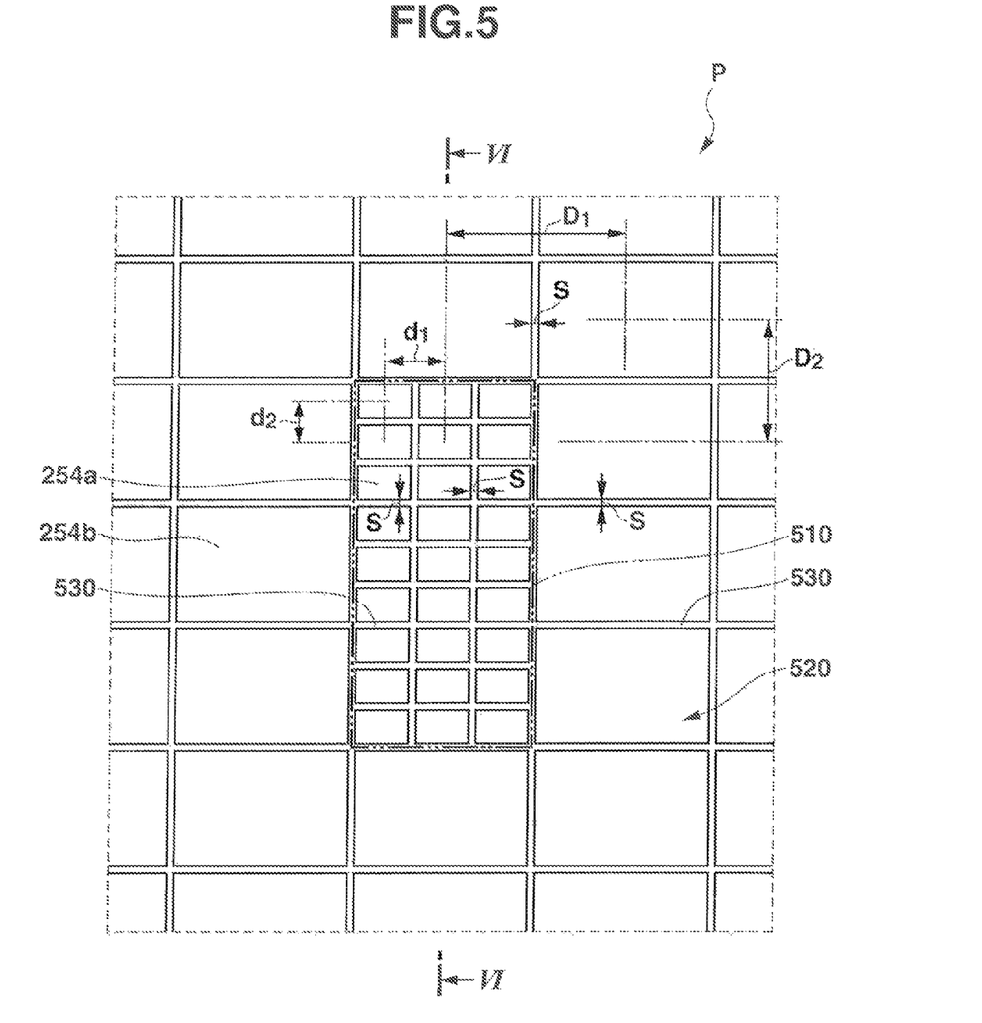
FIG. 5 is an enlarged view of a portion P of the microlens array, shown in FIG. 4, of the projector according to the embodiment of the invention.
Figure 6:
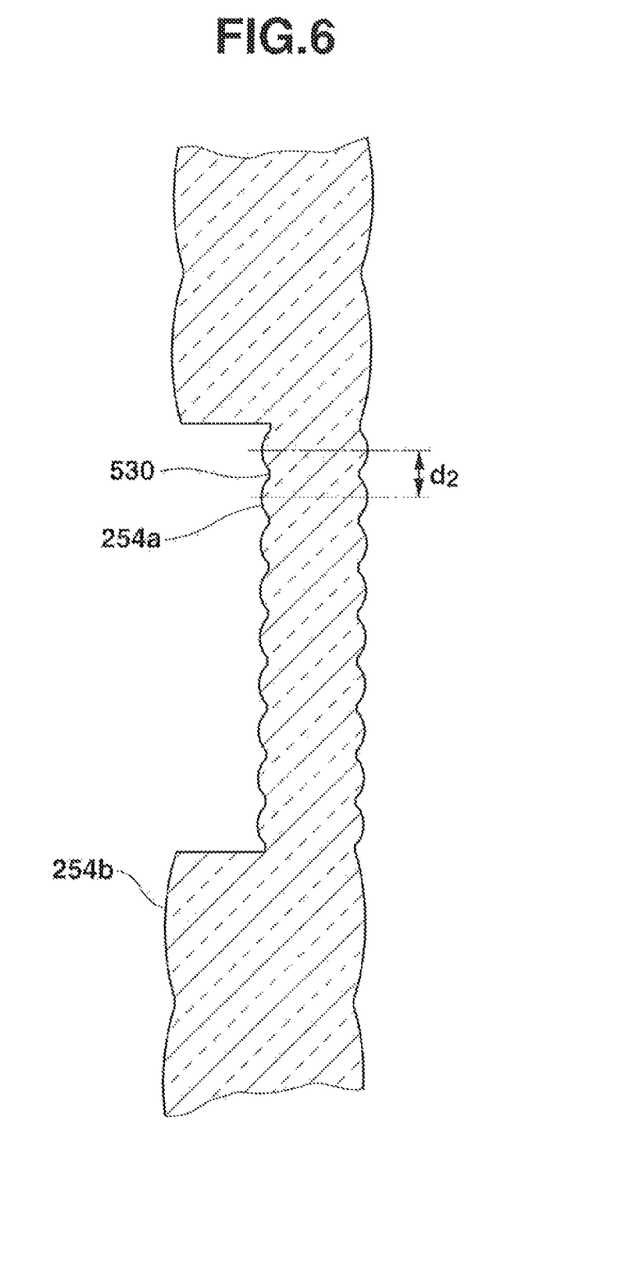
FIG. 6 is a sectional view of the microlens array of the projector according to the embodiment of the invention that is taken along a line VI-VI in FIG. 5.
Figure 7:
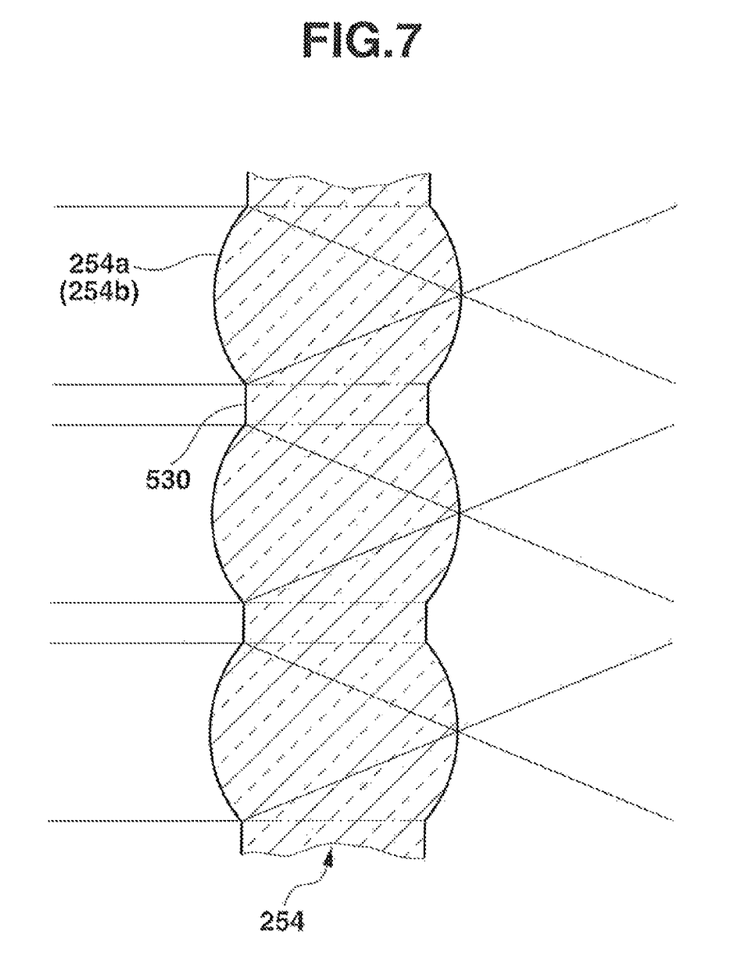
FIG. 7 is a sectional schematic view of the microlens array of the projector according to the embodiment of the invention that shows how light enters and emerges from the microlens array.

Next, referring to FIGS. 4 to 7, the configuration of the microlens array 254 and how the light source lights from the first light source and the second light source are incident on the microlens array 254 will be described. FIG. 4 is a schematic view showing the microlens array 254 seen from the front thereof and shows how the light source lights from the two-color light source device 400 that is the first light source and the green light source device 80 that is the second light source are incident on the microlens array 254. FIG. 5 is an enlarged view of a portion P in FIG. 4. FIG. 6 is a sectional view taken along a line VI-VI in FIG. 5. FIG. 7 is a schematic view showing how lights are incident on the microlenses.

In FIG. 4, lights in the blue wavelength range that are emitted from the blue laser diodes 301 of the blue light source device 300 and whose cross sections are elliptic are estimated to enter estimated light entering ranges on the microlens array 254, and the estimated light entering ranges are shown as blue light entering ranges 301B which are each formed into a vertically elongated rectangle. Similarly, lights in the red wavelength range that are emitted from the red laser diodes 121 of the red light source device 120 and whose cross sections are elliptic are estimated to enter estimated light entering ranges on the microlens array 254, and the estimated light entering ranges are shown as red light entering ranges 121R which are each formed into a vertically elongated rectangle. Consequently, the blue light entering ranges 301B are disposed so as to match in position the blue laser diodes 301. Thus, the blue light entering ranges 301B are disposed in two positions that are aligned vertically substantially at the center of the microlens array 254. Similarly, the red light entering ranges 121R are disposed so as to match in position the red laser diodes 121. Thus, the red light entering ranges 121R are disposed in two positions that are aligned vertically on each side of the two blue light entering ranges 301B in relation to the front-to-rear direction of the casing of the projector 10. Thus, the red light entering ranges 121R are four in total. On the other hand, light source light from the green light source device 80 enters a green light entering range 80G that is shown as a circle.

The lights emitted from the blue laser diodes 301 and the red laser diodes 121 have strong directionality and narrow illumination ranges. On the other hand, the light source light from the green light source device 80 is emitted as luminescent light that is emitted in every direction from the luminescent material layer on the luminescent wheel 101, and therefore, the light source light from the green light source device 80 illuminates a wide range. Thus, the green light entering range 80G expands over the circular wide range that includes the blue light entering range 301B and the red light entering range 121R.

Next, the portion P shown in FIG. 4 will be described by reference to FIG. 5 showing the portion P in an enlarged fashion. In FIG. 5, a rectangular range surrounded by a chain double-dashed line substantially at a central portion is a first area 510. The area 510 matches the red light entering range 121R of the red laser diode 121 at the portion P in FIG. 4. Microlenses 254a that are formed microscopically are arranged in the first area 510 so that light emitted from the laser diode to be incident thereon can be emitted as diffuse light that is diffused sufficiently uniformly.

Additionally, an area that lies out of the first area 510 but lies within an effective range of the microlens array 254 is referred to as a second area 520. In the second area 520, microlenses 254b are arranged which are formed larger than the microlenses 254a in the first area 510. However, luminescent light emitted from the green light source device 80 to be incident on the microlenses 254b can be emitted as diffuse light that is diffused sufficiently uniformly. The microlenses 254a, 254b in the first area 510 and the second area 520 are each formed into a horizontally elongated rectangle when seen from thereabove. A plurality of first areas 510 are provided to match the blue light entering ranges 310B and the red light entering ranges 121R. Thus, the second area 520 is formed so that portions thereof lie between adjacent ones of the plurality of first areas 510.

Spaces S defined between the microlenses 254a that lie adjacent vertically and horizontally in the first area 510 are the same. Intervals at which the microlenses 254a are arranged in the first area 510 are d1 in the horizontal direction and d2 in the vertical direction. Spaces S defined between the microlenses 254b that lie adjacent vertically and horizontally in the second area 520 are also the same. Intervals at which the microlenses 254b are arranged in the second area 520 are D1 in the horizontal direction and D2 in the vertical direction. Spaces defined between the microlenses 254a in the first area 510 and the microlenses 25b in the second area that lie adjacent vertically and horizontally are also the same as the spaces S. Namely, the spaces defined between the adjacent ones of the microlenses 254a, 254b of the microlens array 254 are all the spaces S and are formed as narrow as possible.

The microlenses 254a in the first area 510 are formed smaller than the microlenses 254b in the second area 520. Consequently, since the spaces across which the microlenses 254a, 254b lie adjacent to each other are the spaces S and are the same, in comparing the arrangement intervals of the microlenses 254a with those of the microlenses 254b, the arrangement intervals d1, d2 of the first area 510 are smaller than the arrangement intervals D1, D2 of the second area 520.

Here, areas made up of the spaces S across which the microlenses 254a, 254b lie adjacent to each other are non-lens areas 530 that are formed flat and that constitute non-lens portions as shown in the sectional view of FIG. 6. Additionally, as shown in FIG. 7, in the light that is incident on the microlens array 254, light that is incident on the microlenses 254a, 254b is emitted as light that is uniformly diffused. However, light that is incident on the non-lens areas 530 is not diffused and hence is not used effectively. Then, as shown in FIG. 5, spaces S of the non-lens areas 530 can be reduced only to a certain limit in relation to the method of fabricating the microlens array 254.

As has been described above, in this embodiment, the spaces S across which the microlenses 254a are arranged in the first area 510 are formed the same as the spaces S across which the microlenses 254b are arranged in the second area 520. Additionally, the microlenses 254a in the first area 510 are formed smaller than the microlenses 254b in the second area. Consequently, the area of the non-lens area 530 per unit area of the first area 510 becomes larger than that of the second area 520. In other words, the size of the area per unit area where ineffective light is emitted becomes larger in the first area 510 than in the second area 520.

In this embodiment, the red light entering ranges 121R and the blue light entering ranges 301B that are the estimated laser beam entering ranges are formed in the first area 510. Then, the microlenses 254a that are formed microscopically so as to diffuse efficiently the lights emitted from the laser diodes that have the strong directionality and the narrow illumination range are formed in the first area 510. The microlenses 254b that can diffuse sufficiently the incident light from the luminescent light emitting device 100 are arranged in the second area 520. Then, the laser beams from the laser diodes are incident on the first area 510, and the incident light from the green light source device 80 is shone on to both the first area 510 and the second area 520.

Then, the lights emitted from the blue laser diodes 301 and the red laser diodes 121 are incident on the first area 510 and are thereby divided sufficiently to be diffused. The luminous light emitted from the green light source device 80 is divided sufficiently in the first area 510 and the second area 520 to be diffused and is emitted from the microlens array 254 with high light efficiency by the second area 520 where a relatively smaller number of non-lens areas 530 are provided. In this way, the lights emitted from the first light source and the second light source are shone on to the microlens array 254, and therefore, in case the lights that have passed through the microlens array 254 are collected by the collective lens 255 to be emitted on the display device 51, it is possible to obtain light with high light efficiency that is sufficiently uniformly diffused.

Thus, although the embodiment of the invention has been described heretofore, the invention is not limited thereto but can be carried out by making modifications thereto as required. For example, in this embodiment, while the microlenses 254a, 254b are formed into the horizontally elongated rectangle when seen from thereabove, these microlenses can be formed into other shapes including a circular shape. However, it is preferable that the microlenses have the horizontally elongated rectangular shape so as to match the display device 51. Additionally, in this embodiment, the first light source is made up of the two-color light source device 400 that is made up, in turn, of the red light source device 120 and the blue light source device 300, and the second light source is made up of the green light source 80. However, depending upon the mode of the projector 10, the light source unit 60 may be configured as a light source unit that includes at least lights in the red, green and blue wavelength ranges for a projector 10 that has a light source device that emits light in other wavelength ranges including light in the yellow wavelength range.

In the embodiment described above, the projector 10 includes the two-color light source device 400 that is the first light source made up of the plurality of laser diodes and the green light source device 80 that is the second light source. Additionally, the projector 10 includes the microlens array 254 on which the lights that are emitted from the first light source and the second light source are incident. The microlens array 254 is made up of the first area 510 and the second area 520 where the microlenses 254b are arranged with the wider intervals D1, D2 than the intervals d1, d2 with which the microlenses 254a are arranged in the first area 510. Then, the lights emitted from the first light source are caused to be incident on the first area 510, and the light emitted from the second light source is caused to be incident on the first area 510 and the second area 520.

This configuration enables the lights emitted from the first light source having the laser diodes to be diffused sufficiently uniformly by the first area 51. Additionally, the light emitted from the second light source that has the wider illumination range than those of the laser diodes is diffused sufficiently uniformly not only in the first area 510 but also in the second area 520. Consequently, according to the invention, in the microlens array 254 where the lights emitted from the first light source and the second light source are diffused sufficiently uniformly, compared with the conventional case where the microlenses that are formed microscopically are arranged over the whole of the effective surface of the microlens array 254, the non-lens area where the luminescent light emitted from the second light source becomes ineffective can be reduced, thereby making it possible to improve the light utilization efficiency of the light source light.

The portions of the second area are formed between the first areas 510 that lie adjacent to each other. This enables the first areas 510 to be formed according to the arrangement of the respective laser diodes of the blue light source device 300 and the red light source device 120 that make up the first light source.

The dichroic mirror 141 is disposed in the position where the axes of the lights that are emitted from the blue light source device 300 and the red light source device 120 that make up the first light source intersect with the axis of the light emitted from the green light source device 80 that makes up the second light source. This dichroic mirror 141 transmits the light in the blue wavelength range and the light in the red wavelength range and reflects the light in the green wavelength range so that the lights in the blue, red and green wavelength ranges are emitted in the same direction.

This enables the single dichroic mirror 141 to change the optical paths of the lights in the red, blue and green wavelength ranges, and therefore, the number of optical parts can be reduced, which enables the projector 10 to be made compact, whereby the projector 10 can be made more portable.

The first light source and the second light source are formed so that the axes of the lights emitted from the two-color light source device 400 that makes up the first light source intersect with the axis of the light emitted from the green light source device 80 that makes up the second light source at right angles. This facilitates the laying out of the dichroic mirror 141 within the projector 10, as well as the laying out of the other optical parts including the microlens array 254 and the like.

The first light source includes the blue laser diodes 301 and the red laser diodes 121, and the excitation light sources 71 of the second light source are made up of the blue laser diodes. This enables the light source lights of those light sources to be emitted from the high-intensity laser diodes, and therefore, the high-intensity light source unit 60 can be made suitable for the projector 10, whereby it is possible to obtain the projector 10 that can project bright projected light having good color developing property. Although the first light source is made to include the blue laser diodes 301 and the red laser diodes 121, the invention is not limited to that configuration. The first light source may include either of the blue and red laser diodes or may include a laser diode that emits light in a different wavelength range from the blue and red wavelength ranges. Alternatively, the first light source may include, in place of laser diodes, light emitting diodes (LEDs) or luminescent materials that emit luminescent light by receiving excitation light.

Although the blue laser diodes are used as the excitation light sources 71 of the second light source, the invention is not limited to this configuration. A laser diode that emits light in a different wavelength range may be used as the excitation light sources 71. Alternatively, a light emitting diode (LED) or a luminescent material that emits luminescent light by receiving excitation light may be used as the excitation light sources 71.

The microlenses that are formed into the horizontally elongated rectangle when seen from thereabove are used for the microlenses 254a, 254b of the microlens array 254. The non-lens areas 530 where incident light is made ineffective can be reduced more in the microlens array that uses the microlenses as mentioned above, comparing with a microlens array that uses microlenses that are circular when seen from thereabove.

The projector 10 is made to include the collective lens 255 that collects the lights emitted from the microlens array 254, the display device 51 on to which the lights emitted from the collective lens 255 are shone to produce projected light, the projection optical system 168 that guides the projected light, and the control unit. By being so configured, the projector 10 can reduces the non-lens areas 530 where incident light on the microlens array 254 becomes ineffective to improve the light efficiency, whereby the projector 10 can project a bright and high-quality image with good color balance by using the display device such as the DMDs or the like.

The embodiment that has been described heretofore is presented as the example, and hence, the embodiment is not intended to limit the scope of the invention. The novel embodiment can be carried out in other various forms. Thus, various omissions, replacements and alterations can be made without departing from the spirit and scope of the invention. The embodiment and its modifications are included in the spirit and scope of the invention and the scope of inventions described in claims and their equivalents.

What is claimed is:

1. A light source unit comprising:
   a microlens array having a first area and a second area where microlenses are arranged with a wider interval than an interval with which microlenses are arranged in the first area;
   a first light source configured to emit light that is to be incident on the first area; and
   a second light source configured to emit light that is to be incident on the first area and the second area,
   wherein the microlens array is configured to diffuse the light emitted from the first light source and the light emitted from the second light source by the microlenses,
   wherein the second area is formed around the first area, and
   wherein an angle at which the light from the second light source is emitted is greater than an angle at which the light from the first light source is emitted.

2. The light source unit according to claim 1,
   wherein the first light source comprises a semiconductor light emitting device, and
   wherein the second light source comprises a luminescent material layer configured to emit luminescent light as a result of light emitted from an excitation light source being shone on the luminescent material layer.

3. The light source unit according to claim 1,
   wherein the first light source and the second light source are provided so that an axis of the light emitted from the first light source intersects with an axis of the light emitted from the second light source, and
   wherein the light source unit further comprises:
   a dichroic mirror disposed in a position where the axis of the light emitted from the first light source intersects with the axis of the light emitted from the second light source, wherein the dichroic mirror is configured to transmit the light emitted from the first light source and reflect the light emitted from the second light source to thereby emit both the lights in the same direction.

4. The light source unit according to claim 2,
   wherein the first light source and the second light source are provided so that an axis of the light emitted from the first light source intersects with an axis of the light emitted from the second light source, and wherein the light source unit further comprises:

a dichroic mirror disposed in a position where the axis of the light emitted from the first light source intersects with the axis of the light emitted from the second light source, wherein the dichroic mirror is configured to transmit the light emitted from the first light source and reflect the light emitted from the second light source to thereby emit both the lights in the same direction.

5. The light source unit according to claim 1, wherein the first light source and the second light source are provided so that the axis of the light emitted from the first light source intersects with the axis of the light emitted from the second light source at right angles.

6. The light source unit according to claim 2, wherein the first light source and the second light source are provided so that the axis of the light emitted from the first light source intersects with the axis of the light emitted from the second light source at right angles.

7. The light source unit according to claim 3, wherein the first light source and the second light source are provided so that the axis of the light emitted from the first light source intersects with the axis of the light emitted from the second light source at right angles.

8. The light source unit according to claim 4, wherein the first light source and the second light source are provided so that the axis of the light emitted from the first light source intersects with the axis of the light emitted from the second light source at right angles.

9. The light source unit according to claim 1, wherein the semiconductor light emitting device of the first light source comprises a blue laser diode and a red laser diode, and wherein the second light source comprises a blue laser diode.

10. The light source unit according to claim 2, wherein the semiconductor light emitting device of the first light source comprises a blue laser diode and a red laser diode, and wherein the second light source comprises a blue laser diode.

11. The light source unit according to claim 3, wherein the semiconductor light emitting device of the first light source comprises a blue laser diode and a red laser diode, and wherein the second light source comprises a blue laser diode.

12. The light source unit according to claim 5, wherein the semiconductor light emitting device of the first light source comprises a blue laser diode and a red laser diode, and wherein the second light source comprises a blue laser diode.

13. The light source unit according to claim 1, wherein the microlenses are formed into a horizontally elongated rectangle when seen from thereabove.

14. The light source unit according to claim 2, wherein the microlenses are formed into a horizontally elongated rectangle when seen from thereabove.

15. The light source unit according to claim 3, wherein the microlenses are formed into a horizontally elongated rectangle when seen from thereabove.

16. The light source unit according to claim 5, wherein the microlenses are formed into a horizontally elongated rectangle when seen from thereabove.

17. The light source unit according to claim 9, wherein the microlenses are formed into a horizontally elongated rectangle when seen from thereabove.

18. The light source unit according to claim 10, wherein the microlenses are formed into a horizontally elongated rectangle when seen from thereabove.

19. A projector comprising:

a light source unit comprising:

a microlens array having a first area and a second area where microlenses are arranged with a wider interval than an interval with which microlenses are arranged in the first area;

a first light source configured to emit light that is to be incident on the first area; and a second light source configured to emit light that is to be incident on the first area and the second area, wherein the microlens array is configured to diffuse the light emitted from the first light source and the light emitted from the second light source by the microlenses, wherein the second area is formed around the first area, and wherein an angle at which the light from the second light source is emitted is greater than an angle at which the light from the first source is emitted, a collective lens configured to collect diffuse lights that are diffused by the microlens array;

a display device on which the diffuse lights that are collected by the collective lens are shone to produce projected light;

a projection optical system configured to guide the projected light produced by the display device; and a control unit configured to control the display device and the light source unit.

20. The projector according to claim 19, wherein the microlenses of the first area and the second area of the microlens array are similar in shape to the display device.

* * * * *